United States Patent
Recksiek et al.

(10) Patent No.: US 8,418,955 B2
(45) Date of Patent: Apr. 16, 2013

(54) CONTROL SYSTEM FOR A HYDRAULICALLY ACTUATABLE HORIZONTAL STABILIZER AND TEST METHOD FOR TESTING THE INTEGRITY OF A CONTROL SYSTEM

(75) Inventors: Martin Recksiek, Hamburg (DE); Thomas Epple, Roethenbach (DE)

(73) Assignee: Airbus Operations GmbH, Hamburg (DE)

( * ) Notice: Subject to any disclaimer, the term of this patent is extended or adjusted under 35 U.S.C. 154(b) by 263 days.

(21) Appl. No.: 12/992,668

(22) PCT Filed: May 15, 2009

(86) PCT No.: PCT/EP2009/003509
§ 371 (c)(1),
(2), (4) Date: Dec. 6, 2010

(87) PCT Pub. No.: WO2009/138251
PCT Pub. Date: Nov. 19, 2009

(65) Prior Publication Data
US 2011/0068221 A1    Mar. 24, 2011

Related U.S. Application Data

(60) Provisional application No. 61/053,297, filed on May 15, 2008.

(30) Foreign Application Priority Data

May 15, 2008  (DE) .................... 10 2008 023 628

(51) Int. Cl.
*B64C 5/10*  (2006.01)
(52) U.S. Cl.
USPC ........ 244/99.5; 244/99.6; 244/99.3; 701/29.7

(58) Field of Classification Search ................. 244/99.6, 244/99.5, 99.2, 99.4
See application file for complete search history.

(56) References Cited

U.S. PATENT DOCUMENTS

| | | | | |
|---|---|---|---|---|
| 5,109,672 A | * | 5/1992 | Chenoweth et al. | 60/456 |
| 6,685,138 B1 | * | 2/2004 | Krantz | 244/99.5 |

(Continued)

FOREIGN PATENT DOCUMENTS

| | | |
|---|---|---|
| DE | 102004047008 A1 | 3/2006 |
| DE | 102005042511 A1 | 4/2007 |

(Continued)

OTHER PUBLICATIONS

International Search Report for corresponding PCT Application PCT/2009/003509, dated Oct. 5, 2009.

(Continued)

*Primary Examiner* — Christopher P Ellis
*Assistant Examiner* — Medhat Badawi
(74) *Attorney, Agent, or Firm* — Matthew B. Dernier, Esq.; Gibson & Dernier LLP

(57) ABSTRACT

An actuation system includes: two hydraulic actuators, each being coupled to a load-bearing structural component and to an elevator, and displaceable relative to the load-bearing structural component for the operation of the elevator; a first control valve device to control the first actuator; a second control valve device to control the second actuator; a control and monitoring unit that determines and transmits appropriate command signals to the control valve devices to execute appropriate control movements for the operation of the actuators; a locking device coupled to the first actuator to secure the first actuator a locked state, which is hydraulically connected with the first hydraulic system and the second hydraulic system via an hydraulic OR-circuit, where in normal operation the locking mechanism is in its unlocked state, and in the event of a failure of both hydraulic systems the locking mechanism secures the first actuator.

13 Claims, 1 Drawing Sheet

U.S. PATENT DOCUMENTS

| | | | | |
|---|---|---|---|---|
| 7,175,133 B2* | 2/2007 | Tanaka et al. | ............... | 244/99.4 |
| 7,464,896 B2* | 12/2008 | Carl et al. | ................... | 244/99.2 |
| 7,600,715 B2* | 10/2009 | Matsui | ....................... | 244/99.6 |
| 7,607,611 B2* | 10/2009 | Wingett et al. | .............. | 244/99.3 |
| 7,870,726 B2* | 1/2011 | Matsui | ........................... | 60/405 |
| 2002/0121086 A1* | 9/2002 | Flavell | ............................ | 60/405 |
| 2006/0144996 A1* | 7/2006 | Carl et al. | .................. | 244/99.2 |
| 2006/0226285 A1* | 10/2006 | Matsui | ....................... | 244/99.6 |
| 2007/0018040 A1* | 1/2007 | Wingett et al. | ............. | 244/99.4 |
| 2008/0022849 A1* | 1/2008 | Kamenz et al. | ................. | 92/15 |
| 2008/0203223 A1* | 8/2008 | Cyrot et al. | ................. | 244/99.3 |
| 2008/0203234 A1* | 8/2008 | Haase | ......................... | 244/224 |
| 2009/0272110 A1* | 11/2009 | Matsui | ........................... | 60/451 |

FOREIGN PATENT DOCUMENTS

| | | |
|---|---|---|
| DE | 102006039671 A1 | 3/2008 |
| EP | 1061269 A2 | 12/2000 |
| EP | 1721825 A | 11/2006 |
| EP | 1878658 A | 1/2008 |
| WO | 2006105048 A1 | 10/2006 |

OTHER PUBLICATIONS

International Preliminary Report on Patentability and Written Opinion for corresponding PCT Application PCT/2009/003509, dated Dec. 6, 2010.

* cited by examiner

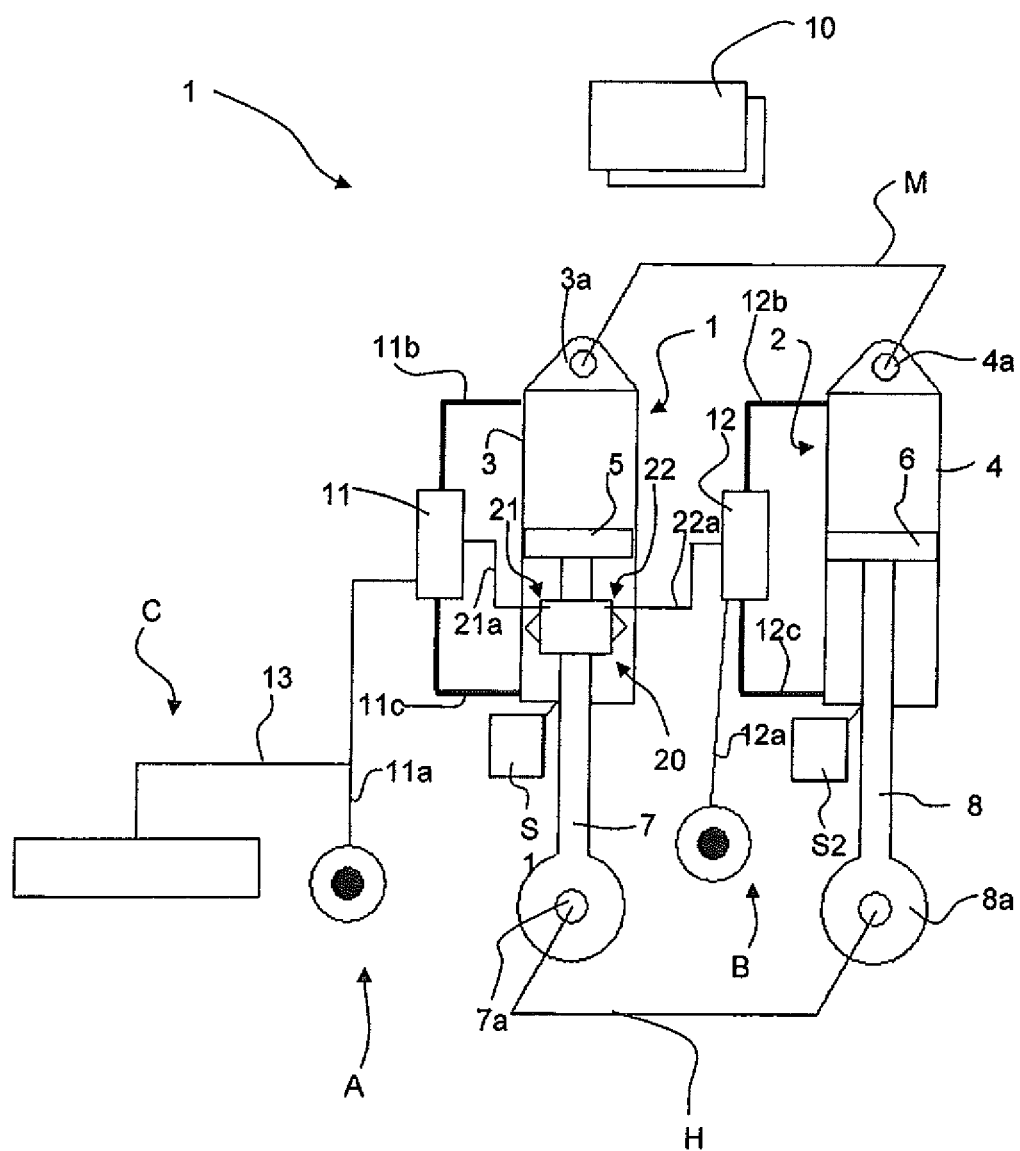

CONTROL SYSTEM FOR A HYDRAULICALLY ACTUATABLE HORIZONTAL STABILIZER AND TEST METHOD FOR TESTING THE INTEGRITY OF A CONTROL SYSTEM

CROSS REFERENCE TO RELATED APPLICATIONS

This application claims priority to PCT Application No. PCT/EP2009/003509, filed May 15, 2009; which claims priority to German Patent Application No. DE 10 2008 023 628.4, filed May 15, 2008, and claims the benefit to U.S. Provisional Patent Application No. 61/053,297, filed May 15, 2008, the entire disclosures of which applications are hereby incorporated by reference.

BACKGROUND

The invention concerns an actuation system for a hydraulically operable elevator and a test method to check the integrity of an actuation system.

Normally aircraft elevators whose inclination can be altered relative to the longitudinal alignment of an aircraft fuselage are trimmed, i.e. altered in their inclination relative to the aircraft fuselage, using trapezoidal thread screws or recirculating ball screws. Since very high demands are placed on trimming actuators of this kind with regard to their reliability, i.e. probability of failure, two load paths must be provided in most cases, implemented in terms of a spindle with an internal second load path and a duplicated connection to the structure. However, this results in a design that is relatively complex in mechanical terms. Elevator actuation systems with trimming spindles with an internal second load path cannot be monitored fully automatically as regards their structural integrity. Furthermore actuation systems of this kind have internal free play as a result of their structural joints, which can lead to undesirable aeroelastic effects and impairment of passenger comfort.

In general actuation systems with spindles are the cause of a relatively large maintenance activity and hide the risk of a mechanical seizure of the actuation system.

DE 10 2005 042 511 A1 discloses a trim actuator operating system comprising a hydraulic linear actuator, a blocking device for blocking the actuator and two hydraulic systems for operating the actuator.

EP 1 721 825 A1 describes a flight control surface actuation system with two actuator devices. One of the actuator devices is realized by an electro-mechanical actuator which can be blocked by a locking device.

From DE 10 2004 047008 A1 a drive solution with two parallel, mechanically synchronised spindles, is of known art.

In DE 10 2005 042 511 A1 an hydraulic simplex elevator drive with power supply redundancy and mechanical locking is described. With this drive concept a high degree of fault tolerance and satisfaction of high availability requirements is only achieved in a very limited manner, or in fact not at all. Because of the simple form of structural joint this drive also has internal free play.

SUMMARY OF THE INVENTION

The task of the invention is to provide an actuation system for a hydraulically operable aircraft elevator, which can be monitored as well as possible with regard to its integrity, is fault tolerant, and is simply configured in its construction.

A further task of the invention is to provide an actuation system for a hydraulically operable aircraft elevator in which as little internal free play occurs as possible.

These tasks are achieved with the features of one or more embodiments disclosed and/or described herein. Further forms of such embodiments are also disclosed and/or described herein.

In accordance with the invention an actuation system is provided for a hydraulically operable aircraft elevator, having:
  two actuators supplied from at least one hydraulic supply system, of which each is coupled to a load-bearing structural component, and to an elevator displaceable relative to the load-bearing structural component, for the operation of the elevator,
  a first control valve device, hydraulically connected to the first actuator for the control of the latter, and a second control valve device, hydraulically connected to the second actuator for the control of the latter, which devices are respectively supplied from an hydraulic system,
  a control and monitoring unit functionally connected with the control valve devices, which determines appropriate command signals for the control valve devices, and transmits the signals to the latter for the execution of appropriate control movements to operate the actuators,
  a locking device coupled to the first actuator with a locking mechanism to secure the extended position of the pushrod of the first actuator in its locked state, which is hydraulically connected with the first hydraulic system and with the second hydraulic system via an hydraulic OR-circuit such that in normal operation of at least one of the hydraulic systems the locking mechanism is in its unlocked state, and in the event of a failure of both hydraulic systems the locking mechanism under a minimum pressure secures the extended position of the pushrod of the first actuator.

The actuation system can furthermore have: state sensors functionally connected with the control and monitoring unit to determine the displacement state of structural joints connecting the actuators to the elevator, or of regions that are located at the structural joints. Here the locking device coupled to the first actuator furthermore has a lock activation device, which is functionally connected with the control and monitoring unit, and which has a lock activation device, which upon the receipt of an activation signal activates the locking mechanism. Furthermore in this embodiment the control and monitoring unit can have a reconfiguration function, which on the basis of the detection of a fault state in the actuation system transmits an activation signal to the lock activation device to secure the extended position of the pushrod of the first actuator, if the displacement states registered on both structural joints deviate by a predetermined measure from the respective REQUIRED-commands of the control and monitoring unit.

In a further form of embodiment of the actuation system in accordance with the invention provision can be made that the control and monitoring unit has a reconfiguration function for the detection of a fault state in the actuation system; the reconfiguration function has a comparison function, with which REQUIRED-commands of the control and monitoring unit are compared with the displacement states registered on both structural joints of the actuators, and transmits an activation signal to the lock activation device to secure the extended position of the pushrod of the first actuator, if the displacement states registered on both structural joints deviate by more than a predetermined measure from the respective REQUIRED-commands of the control and monitoring unit.

In these examples of embodiment of the actuation system in accordance with the invention provision can furthermore be made that to secure the extended position of the pushrod of the first actuator the control and monitoring unit transmits the activation signal to the first control valve device, which transmits an activation signal to the lock activation device.

A further example of embodiment of the actuation system in accordance with the invention can provide the control and monitoring unit, such that in the case in which the displacement states registered at one of the two structural joints deviate by a predetermined measure from the respective REQUIRED-commands of the control and monitoring unit for the respectively associated control valve device, the control and monitoring unit switches the respectively associated control valve device to through flow, so that the respectively associated actuator is carried along with the respectively other actuator.

In the examples of embodiment cited the state sensors can respectively be arranged on the actuators to determine the displacement state of actuators or structural joints of the actuators, and can be configured such that these register an extended position of the pushrods. Alternatively or additionally in the examples of embodiment cited the state sensors can be respectively arranged on the structural joints of the actuators to determine the displacement state of actuators or structural joints of the actuators, and can register an extended position of their regions connecting to the elevator. In general to determine the displacement state of structural joints of the actuators and/or of the actuators the state sensors can be suitable and equipped such that these additionally register the actuation velocity and/or the actuation acceleration of the pushrods.

In these examples of embodiment of the actuation system in accordance with the invention each of the control valve devices can be connected respectively to an hydraulic supply system, and the control and monitoring unit can be configured such that in the event that a fault state has been associated with one of the hydraulic supply systems, the control and monitoring unit switches the respectively associated control valve device to through flow, so that the respectively associated actuator is carried along with the other actuator in each case. In this example of embodiment the control and monitoring unit can be configured such that in the event that a fault state has been associated with both of the hydraulic supply systems, the control and monitoring unit transmits an activation signal to the lock activation device.

In accordance with the invention an actuation system can be provided for a hydraulically operable aircraft elevator, which has:
  two actuators, of which each is coupled to a load-bearing structural component, and to an elevator displaceable relative to the load-bearing structural component, for the operation of the elevator,
  a first control valve device, hydraulically connected to the first actuator for the control of the latter, which is supplied from a first hydraulic system, and a second control valve device, hydraulically connected to the second actuator for the control of the latter, which is supplied from a second hydraulic system,
  a control and monitoring unit functionally connected with the control valve devices, which can determine appropriate command signals for the control valve devices and can transmit these signals for the execution of appropriate control movements to operate the actuators, wherein in standard operation the control and monitoring unit for the actuation of the actuators and thus of the elevator in the respectively current time interval only actually controls the first of the two control valve devices and switches the respectively other of the control devices to through flow, wherein the control and monitoring unit has a reconfiguration function, which controls the second of the two control valve devices and switches the first of the control valve devices to through flow, if the control and monitoring unit associates a fault state with the first control valve device and/or the first actuator and/or the first hydraulic system.

In this example of embodiment of the actuation system in accordance with the invention with respectively one active and one passive control valve device in one time interval the features of the previously described actuation system and its examples of embodiment can logically also be provided.

In particular in this actuation system provision is made in accordance with the invention that a locking device coupled to the first actuator with a locking mechanism to secure the extended position of the pushrod of the first actuator in its locked state is provided, which is hydraulically connected with the first hydraulic system and with the second hydraulic system via an hydraulic OR-circuit, such that in normal operation of at least one of the hydraulic systems the locking mechanism is in its unlocked state, and in the event of a failure of both hydraulic systems the locking mechanism under a minimum pressure secures the extended position of the pushrod of the first actuator.

Furthermore in the example of embodiment of the actuation system in accordance with the invention with respectively one active and one passive control valve device in one time interval, provision can be made that:
  the control and monitoring unit is functionally connected with state sensors to determine the displacement state of structural joints connecting the actuators to the elevator, or of regions that are located at the structural joints, and
  the locking device has a lock activation device, which is functionally connected with the control and monitoring unit, and which upon the receipt of an activation signal activates the locking mechanism.

Here provision can furthermore be made that the control and monitoring unit has a reconfiguration function, which on the basis of the detection of a fault state in the actuation system transmits an activation signal to the lock activation device to secure the extended position of the pushrod of the first actuator, if the displacement states registered on both structural joints deviate by a predetermined measure from the respective REQUIRED-commands of the control and monitoring unit.

Furthermore in accordance with the invention a test method is provided to check the integrity of an actuation system for the operation of an aircraft elevator with two actuators. Here the actuation system is configured in accordance with an example of embodiment in accordance with the invention, and in particular has: two control valve devices for the control of the actuators, a control and monitoring unit functionally linked with the control valve devices, which determines appropriate command signals for the control valve devices and transmits these signals to the latter for the execution of corresponding control movements for the operation of the actuators, and a locking device coupled to the first actuator with a locking mechanism to secure the extended position of the pushrod of the first actuator in its locked state. In the test method the following steps are provided:
  reception of the measured values of the state sensors to register a first displacement position of the elevator, activation of the locking device to block the first actuator,
operation of the second actuator in at least one prescribed
direction,
after operation of the second actuator reception of the
measured values of the state sensors to register a second
displacement position, and
comparison of the first displacement position with the second displacement position and generation of a fault signal if the difference between the first displacement position and the second displacement position exceeds a prescribed limit.

BRIEF DESCRIPTION OF THE DRAWINGS

In what follows, examples of one or more embodiments of the invention are described with the aid of the accompanying FIGURE, FIG. 1, which shows a functional representation of one form of embodiment of the actuation system according to the invention for a hydraulically operable elevator.

DETAILED DESCRIPTION OF THE INVENTION

The system according to the invention has a first actuator 1 and a second actuator 2, each of which is supplied from an hydraulic system. The actuators 1, 2 have an actuating ram or rams or housing 3 or 4 respectively, with a first mechanical structural joint 3a or 4a respectively, via which the actuators 1, 2 are connected to a load-bearing structural component M (shown schematically). The actuators 1, 2 furthermore have pistons 5 or 6 respectively that can move in the actuators, to which pistons are attached pushrods 7 or 8 respectively with second structural joints 7a or 8a respectively. Each of the pushrods 7 or 8 respectively is connected to form a pushrod-joint mechanism via the second structural joints 7a or 8a respectively on the elevator H, displaceable relative to the load-bearing structural component (shown schematically), such that the elevator is operated by the movement of the pistons 3a or 4a respectively.

Each of the actuators 1, 2 is hydraulically controlled by a control valve device 11, 12 with a control valve, or control valves, and a control function, of which each is functionally connected via a functional connecting line (not shown) with a control and monitoring unit 10. The functional connecting line between the control valve devices 11, 12 and the control and monitoring unit can be a signal connection or a bus connection. Each control valve device 11, 12 converts the command signals received from the control and monitoring unit 10 into control movements, by means of which the hydraulic supply flow and hydraulic return flow are controlled, and thus the movement of the pistons 3a, 3b in the respectively associated actuators 1, 2, for the operation of the elevator. The functional connection between the control valves and the control and monitoring unit 10 is not shown in the FIGURE.

In one example of embodiment the control valve devices 11, 12 are respectively connected to one hydraulic supply system A, B and are supplied from the latter in each case via the control valve-supply flow/return flow-line 11a, 12a. An hydraulic supply flow/return flow line or an actuator supply flow/return flow line 11b or 12b respectively runs from each control valve device 11, 12 to the respectively associated actuator 1 or 2 respectively. In particular a first actuator supply flow/return flow line 11b connects the first control valve 11 with a first side of the first actuator 1 and a second actuator supply flow/return flow line 12b connects the second control valve 12 with a first side of the second actuator 2. The first control valve 11 is connected via an actuator supply flow/return flow line 11c with a second side or output side of the first actuator 1, which is located spaced apart from the first side in the longitudinal direction of the actuator, and the second control valve 12 is connected via an actuator supply flow/return flow line 12c with a second side or output side of the second actuator 2, which is located spaced apart from the first side in the longitudinal direction of the actuator. Via the functional connection the control and monitoring unit 10 transmits control commands to the control valves, which thereupon control the hydraulic supply flow to the respectively associated actuator, and the hydraulic return flow from the respectively associated actuator, in accordance with the control commands, and thereby operate the actuator.

In one particular example of embodiment both control valves 11, 12 can be supplied from one and the same hydraulic supply system, such that both actuators 1, 2 are also operated via the same hydraulic supply system.

Here provision can be made that a further hydraulic supply system C is connected to the first hydraulic supply system A via a supply line 13, which further system is provided for the purpose of an emergency supply in the event of a failure of the first and/or the second hydraulic supply systems A, B. Here the total hydraulic system can be configured either such that the third hydraulic supply system C is already switched on if either the first or the second hydraulic supply system A, B has already failed, or such that the third hydraulic supply system C is switched on only if both, i.e. the first and second hydraulic supply systems A, B, have failed.

A state sensor S1, S2 can be arranged on each of the actuators 1, 2; in particular each sensor registers a position of the pushrods 7 or 8 respectively in the rams 3 or 4 respectively, in other words, an extended position of the pushrods 7 or 8 respectively. The state sensors S1, S2 are provided for the registration of the actuation state of the respective actuators 1, 2, and can be configured such that they can register further state values of the actuators 1, 2 and in particular of the pushrods 7, 8 relative to the rams 3 or 4 respectively, and/or relative to the load-bearing structural component to which they are connected. This can be, e.g., the actuation position, the actuation velocity, and/or the actuation acceleration of the pushrods 7, 8.

Alternatively or additionally a state sensor S1, S2 can also be arranged on the structural joints 7a, 8a of the elevator to determine the displacement state and e.g. the displacement position, the displacement velocity and/or the displacement acceleration of the same, in each case registering in particular a position of the pushrods 7 or 8 respectively in the rams 3 or 4 respectively, in other words, an extended position of the pushrods 7 or 8 respectively.

In addition to the previously described provision of a state sensor to determine a displacement state of the actuator or the elevator, each control valve device 11, 12 can have at least one state sensor (not shown), which is likewise functionally connected via a connecting line (not shown) with the control and monitoring unit 10. The state sensor registers the control state of the respective control valve. This control state can in particular be the position or attitude, and/or velocity, and/or acceleration of a control element of the control valve. In addition the registered control state can also be a pressure difference, wherein the control and monitoring unit 10 is equipped such that the latter can conduct a comparison of two active actuators 1, 2 with its values. The registration or measurement of the pressure differences can in particular take place via pressure gauges on the first control valve and on the second control valve.

In further examples of embodiment each control valve device 11, 12 can also have a plurality of state sensors to increase the fault tolerance and system reliability of the actuation system; each of these sensors registers a control state of the respective control valve and transmits this to the control and monitoring unit 10. In this manner, with e.g. the provision of an appropriate comparison function, the reconfiguration function can check the accuracy of the state sensors and can ensure that sensors that are found, via a majority check, to be in the minority are assigned to the defective state, and that their values are not further used.

In one example of embodiment of the invention each control valve 11, 12 is controlled by the control and monitoring unit 10 (active-active circuit) at one point in time or in the respectively current time interval for operation of the actuators 1, 2 and thus of the elevator. Here the control and monitoring unit 10 determines command signals for each of the control valve devices 11, 12. In that two actuators 1, 2 are actively operated by the control provided by the two control valve devices 11, 12, a difference arises between the actuating states of the two active actuators 1, 2 with reference to the elevator H, such that the control valve devices 11, 12 cause mechanical stresses in the pushrods connecting mechanism between the pushrods 7 and 8 and the elevator H. In one example of embodiment the control function of the control and monitoring unit 10 for the generation of actuation commands for the actuators 3, 4 can be provided such that these are designed to provide a prescribed difference between the actuation positions, which causes deliberate stressing of the pushrods connecting mechanism between the pushrods 7 and 8 and the elevator H. In one further example of embodiment a rule can also be implemented in the control and monitoring unit 10, which uses the values of the state sensors S1 or S2 respectively as input values and generates the actuation commands for the actuators 3, 4 such that with these the actuators 3, 4 take up a prescribed difference between the actuation positions, so as to cause a deliberate stressing of the pushrods connecting mechanism between the pushrods 7 and 8 and the elevator H. In these examples the difference between the actuation positions can also be provided as a function of the actuation position of the actuators. In this manner any bearing clearance in the connection mechanism between the pushrods 7, 8 and the elevator H is prevented. In this example of embodiment both control valve devices 11, 12 actively control the respectively hydraulically connected actuators 1, 2 in an hydraulic manner, i.e. the control states of the respective control valve determine the hydraulic supply flow to the actuator 1, 2 and the hydraulic return flow from the actuator 1, 2 for the control of the operating states of the respectively connected actuator 1, 2. The control and monitoring unit 10 is configured such that it determines and transmits command signals to the control valve devices 11, 12, which thus actively control the respectively associated actuators 1 or 2.

In another example of embodiment of the invention for the operation of the actuators 1, 2 and thus the elevator H at a point in time or in the respectively current time interval only one of the two control valves 11, 12 is actuated by the control and monitoring unit 10 (active-passive circuit). Here the control and monitoring unit 10 determines command signals, but these are only transmitted to one of the two control valve devices 11, 12, which converts these control commands into corresponding control states and in this manner controls and operates the actuator 1 or 2 respectively connected to it. Here the control valve of the respectively other control valve device 11, 12 is switched into a passive state, or "through flow state", in which the hydraulic oil of the two hydraulic lines 11b, 11c, or 12b, 12c, respectively, which connect the respective control valve 11 or 12 to the respectively associated actuator 1 or 2, can flow through the control valve, without essentially being controlled by the control valve. If one of the control valve devices 11, 12 is actively controlling the respectively associated actuator 1 or 2, and the other is held in a passive state, the elevator H is operated by means of the actuator controlled from the control valve device 11 or 12 switched into an active state, while the pushrod-piston combination of the respectively other actuator 2 or 1, on account of the passive state of the associated control valve devices 12, 11, is carried along via the elevator H.

In accordance with the invention at least one of the two actuators 1, 2, in the representation in the FIGURE actuator 1, has a locking device 20. The locking device 20 has a locking mechanism, with which the pushrod 7 of the first actuator 1, and thus the piston 5, can be arrested in the ram 3 and/or on a load-bearing structural component.

In one example of embodiment of the invention the locking device 20 coupled to the first actuator 1 is provided with a locking mechanism to secure the extended position of the pushrod 7 of the first actuator 1 in its locked state. The locking device 20 is hydraulically connected with the first hydraulic system A and with the second hydraulic system B via an hydraulic OR-circuit, such that in normal operation of at least one of the hydraulic systems the locking mechanism is in its unlocked state, and in the event of a failure of both hydraulic systems A, B the locking mechanism under a minimum pressure secures the extended position of the pushrod 7 of the first actuator 1.

Alternatively or additionally the locking device 20 has an activation device 21, 22, which can e.g. be connected using an electrical or hydraulic line 21a, 22a with both control valves 11, 12.

In one example of embodiment the locking device 20 has a pawl and a corresponding receptor for this, and the locking device 20 is configured such that the pawl in its initial state is pre-stressed in its locking state, and in its unlocking state is held. The lock activation device 21, 22 can be configured such that upon receipt of the activation signal it releases the pre-stress on the pawl, so that the pawl moves into the locking position to arrest the actuator. The activation signal can be supplied hydraulically or electrically by means of the control valve device and/or the control and monitoring unit 10.

In the event of a coupling of the reconfiguration function of the control and monitoring unit 10 with the activation function, the control and monitoring unit 10 generates an activation signal, if it has associated a fault with both arrangements of actuator 1 or 2 and control valve device 11 or 12 respectively, in which the actuator is no longer functional, i.e. can no longer be controlled in a predetermined manner by the control and monitoring unit 10. The control and monitoring unit 10 then generates an activation signal and transmits this to the control valve device 11 or 12 respectively that belongs to the combination of control valve device and actuator that is deemed to be defective. A corresponding activation function of the control valve device concerned, 11 or 12 respectively, transmits this activation signal onward to the control valve device 11 or 12 respectively. The activation signal is provided such that with this the locking mechanism is operated to lock the pushrod.

The lock activation device can also be functionally connected directly with the control and monitoring unit 10 and in particular with the reconfiguration function of the control and monitoring unit 10. In this case the control and monitoring unit 10 transmits the activation signal directly to the locking mechanism to operate the locking of the pushrod.

For the functionality of one form of embodiment of the invention the reconfiguration function in the control and monitoring unit 10 can be configured such that this undertakes in predetermined time intervals a REQUIRED-ACTUAL comparison between the REQUIRED-commands currently respectively commanded at each of the active control valves, and the ACTUAL-states registered by means of the state sensors S1, S2 to register the actuation state of the corresponding actuator 1, 2 or elevator. If in one time interval the REQUIRED-command deviates from the registered ACTUAL-state by a predetermined measure, the control and monitoring unit 10 generates the activation signal, depending upon the example of embodiment, to the control valve device 11, 12, or the lock activation device 21, 22, to operate the locking mechanism, such that the actuator with which the locking device 20 is associated (in the example of embodiment shown this is actuator 1) is arrested. Since both the first actuator and also the second actuator 2 are connected via the structural joints 7a, 8a to the elevator H, both actuators are thereby arrested, so that the elevator H is thus also arrested.

In a further form of embodiment of the invention the reconfiguration function in the control and monitoring unit 10 can furthermore be configured such that at predetermined time intervals this undertakes a REQUIRED-ACTUAL comparison between the REQUIRED-commands currently respectively commanded at each of the active control valves and the ACTUAL-states registered by means of the state sensors of the control valve provided in this case. If in this example of embodiment the control and monitoring unit 10 determines the failure of a control valve on the basis of a REQUIRED-ACTUAL comparison of commanded REQUIRED-values and the ACTUAL-states respectively registered at the control valves, and an exceedance of a predetermined difference value, this control valve is switched off, or assigned the "defective" state in the reconfiguration function. If the defective control valve, or one of the defective control valves, is the respectively active control valve, the control of the actuator is switched over from the previously active control valve to another control valve, which then actively controls the actuator. The reconfiguration function is embodied such that this only switches over to a control valve that has not been assigned to the "defective" state.

To increase the fault tolerance and system reliability of the actuation system, in a variant of the example of embodiment, in which one control valve is assigned to each actuator, a group of control valves can also be assigned to one actuator. In this example of embodiment at least one state sensor is provided on each control valve. A group of control valves can in particular have two, three or even four control valves, wherein each control valve is respectively connected to the respective actuator via one actuator supply line and one actuator return flow line. In this case each control valve of the group of control valves is connected to an hydraulic supply system A, B and is respectively controlled and monitored from the control and monitoring unit 10 via one functional connection. Here, however, only one of the control valves is hydraulically connected via its actuator supply line and respectively one actuator return flow line to the respective actuator, of which, however, only one control valve actively controls the actuator, i.e. its control states are hydraulically connected with the actuator to determine its operating states.

In this example of embodiment, therefore, respectively only one control valve of a group of control valves assigned to an actuator is active, i.e. this one control valve controls the respectively assigned actuator. Furthermore a reconfiguration function can be arranged in the control and monitoring unit 10, which transmits the same REQUIRED-command to all control valves of a group of control valves to command the states of the control valves, and monitors the current or ACTUAL-states of the respectively active control valve and the other inactive control valves by means of the state sensors. If the control and monitoring unit 10 determines the failure of a control valve on the basis of a REQUIRED-ACTUAL comparison of commanded REQUIRED-values and the ACTUAL-states registered respectively at the servo-valves and an exceedance of a predetermined difference value, this control valve is switched off, or assigned to the "defective" state in the reconfiguration function. If the defective control valve, or one of the defective control valves, is the respectively active control valve, the control of the actuator is switched over from the previously active control valve to another control valve, which then actively controls the actuator. The reconfiguration function is embodied such that this only switches over to a control valve that has not been assigned to the "defective" state.

Furthermore the control and monitoring unit 10 can have a reconfiguration function that receives signals from the hydraulic supply systems A, B and which on the basis of the signals can establish whether both the hydraulic supply systems A, B are intact. In particular this can take place by means of pressure sensors, with which the hydraulic pressures occurring in the hydraulic supply systems A, B can be registered and transmitted to the control and monitoring unit 10. If the control and monitoring unit 10 establishes that neither of the hydraulic supply systems A, B is functional, in other words e.g. the hydraulic pressures in the hydraulic supply systems A, B have fallen below a lower limit, the control and monitoring unit 10 generates the activation signal cited and transmits this, depending upon the example of embodiment, to the control valve device 11, 12 or the lock activation device 21, 22 to operate the locking mechanism, such that the actuator to which the locking device 20 is assigned is arrested.

In general, the reconfiguration function, which has previously been described as part of the control and monitoring unit 10, can alternatively also be integrated in the control valve device 11, 12, and in particular in the control function itself.

In accordance with the invention a method is furthermore provided to test the actuating system according to the invention in accordance with one of the previous forms of embodiment, in which by means of automated sequencing through a defined test routine or test method evidence of the integrity of the complete load path of the actuating system, and in particular of the functionality of the locking device 20, can be obtained. With the suitable test routine the actuation system according to the invention enables dormant defects to be avoided. Such a test method can be integrated as a test function in the control and monitoring unit 10, and has the steps:

reception of the measured values of the state sensors S1, S2 to register a first or initial displacement position of the elevator H, activation of the locking device 20 to block the first actuator 1, operation of the second actuator 2 in at least one prescribed direction, after operation of the second actuator 2 reception of the measured values of the state sensors S1, S2 to register a second or final displacement position, and comparison of the first displacement position with the second displacement position and generation of a fault signal if the difference between the first displacement position and the second displacement position exceeds a prescribed limit.

In the event that such a fault signal is present, which in particular is generated by a defect of the locking device 20, provision can be made that the control and monitoring unit 10 no longer operates the actuators.

The test method can furthermore provide operation of the second actuator 2 in another direction, which is opposed in direction to the direction of operation of the operation carried out in one of the previous steps.

To command the locking device 23 the functions cited in the described forms of embodiment of the invention, such as e.g. the activation function, can be provided.

The invention claimed is:

1. An actuation system for a hydraulically operable aircraft elevator, comprising:
    two actuators, supplied from at least one hydraulic supply system, of which each is coupled to a load-bearing structural component, and to an elevator displaceable relative to the load-bearing structural component, for the operation of the elevator,
    a first control valve device, hydraulically connected to the first actuator to control the latter, and a second control valve device, hydraulically connected to the second actuator to control the latter, which devices are respectively supplied from an hydraulic system,
    a control and monitoring unit functionally connected with the control valve devices, which determines appropriate command signals for the control valve devices, and transmits the signals to the latter to execute appropriate control movements for the operation of the actuators, and
    a locking device coupled to the first actuator with a locking mechanism to secure an extended position of a pushrod of the first actuator in its locked state, which is hydraulically connected with the first hydraulic system and with the second hydraulic system via an hydraulic OR-circuit, such that in normal operation of at least one of the hydraulic systems, the locking mechanism is in its unlocked state, and such that in the event of the failure of both hydraulic systems the locking mechanism under a minimum pressure secures the extended position of the pushrod of the first actuator.

2. An actuation system for a hydraulically operable elevator in accordance with claim 1, wherein:
    the actuation system furthermore includes: state sensors functionally connected with the control and monitoring unit to determine a displacement state of structural joints connecting the actuators to the elevator, or of regions that are located at the structural joints,
    the locking device coupled to the first actuator furthermore includes a lock activation device, which is functionally connected with the control and monitoring unit and which has a lock activation device, which upon the receipt of an activation signal activates the locking mechanism, and
    the control and monitoring unit has a reconfiguration function, which on the basis of the detection of a fault state in the actuation system, transmits an activation signal to the lock activation device to secure the extended position of the pushrod of the first actuator if the displacement states registered on both structural joints deviate by a predetermined measure from respective REQUIRED-commands of the control and monitoring unit.

3. The actuation system for a hydraulically operable elevator in accordance with claim 2, wherein the control and monitoring unit includes a reconfiguration function for the detection of a fault state in the actuation system, with which REQUIRED-commands of the control and monitoring unit are compared with the displacement states registered by the state sensors on both structural joints of the actuators, and which transmits an activation signal to the lock activation device to secure the extended position of the pushrod of the first actuator, if the displacement states registered on both structural joints deviate by a predetermined measure from the respective REQUIRED-commands of the control and monitoring unit.

4. The actuation system for a hydraulically operable elevator in accordance with claim 2, wherein the control and monitoring unit, to secure the extended position of the pushrod of the first actuator, transmits the activation signal to the first control valve device, which transmits an activation signal to the lock activation device.

5. The actuation system for a hydraulically operable elevator in accordance with claim 2, wherein, in the case in which the displacement state registered at one of the two structural joints deviates by a predetermined measure from the respective REQUIRED-command of the control and monitoring unit for the respectively associated control valve device, the control and monitoring unit switches the respectively associated control valve device to through flow, so that the respectively associated actuator is carried along with the other actuator in each case.

6. The actuation system for a hydraulically operable elevator in accordance with claim 2, wherein the state sensors, to determine the displacement state of the structural joints of the actuators, are respectively arranged on the actuators and register an extended position of the pushrods.

7. The actuation system for a hydraulically operable elevator in accordance with claim 2, wherein the state sensors, to determine the displacement state of the actuators are respectively arranged on the structural joints of the actuators and register an extended position of their regions connecting to the elevator.

8. The actuation system for a hydraulically operable elevator in accordance with claim 6, wherein the state sensors, to determine the displacement state of the structural joints of the actuators in addition register the actuation velocity and/or the actuation acceleration of the pushrods.

9. The actuation system for a hydraulically operable elevator in accordance with claim 2, wherein:
    each of the control valve devices is respectively connected to an hydraulic supply system, and
    in the event that a fault state has been associated with one of the hydraulic supply systems, the control and monitoring unit switches the respectively associated control valve device to through flow, so that the respectively associated actuator is carried along with the respectively other actuator.

10. The actuation system for a hydraulically operable elevator in accordance with claim 9, wherein, in the event that a fault state has been associated with both of the hydraulic supply systems, the control and monitoring unit transmits an activation signal to the lock activation device.

11. An actuation system for a hydraulically operable aircraft elevator, comprising:
    two actuators, of which each is coupled to a load-bearing structural component, and to an elevator, displaceable relative to the load-bearing structural component, for the operation of the elevator,
    a first control valve device, hydraulically connected to the first actuator for the control of the latter, which is supplied from a first hydraulic system, and a second control valve device, hydraulically connected to the second actuator for the control of the latter, which is supplied from a second hydraulic system, and
    a control and monitoring unit functionally connected with the control valve devices, which determines appropriate command signals for the control valve devices, and can transmit these signals to the latter for the execution of appropriate control movements for the operation of the actuators, wherein in normal operation the control and monitoring unit for the actuation of the actuators and thus of the elevator in the respectively current time interval only controls the first of the two control valve devices and switches the respectively other of the control devices to through flow, wherein the control and monitoring unit has a reconfiguration function, which controls the second of the two control valve devices and switches the first of the control valve devices to through flow, if the control and monitoring unit assigns a fault state to the first control valve device and/or the first actuator and/or the first hydraulic system.

12. The actuation system for a hydraulically operable elevator in accordance with claim 11, wherein a locking device is provided, coupled to the first actuator with a locking mechanism to secure the extended position of a pushrod of the first actuator in its locked state, which locking device is hydraulically connected with the first hydraulic system and with the second hydraulic system via an hydraulic OR-circuit, such that in normal operation of at least one of the hydraulic systems the locking mechanism is in its unlocked state, and in the event of a failure of both hydraulic systems the locking mechanism under a minimum pressure secures the extended position of the pushrod of the first actuator.

13. The actuation system for a hydraulically operable elevator in accordance with claim 11, wherein:

the control and monitoring unit is functionally connected with state sensors to determine a displacement state of structural joints connecting the actuators to the elevator, or of regions that are located at the structural joints, the locking device includes a lock activation device, which is functionally connected with the control and monitoring unit, and which upon the receipt of an activation signal activates the locking mechanism, and the control and monitoring unit includes a reconfiguration function, which on the basis of the detection of a fault state in the actuation system transmits an activation signal to the lock activation device to secure the extended position of the pushrod of the respectively active actuator, if the displacement states registered on both structural joints deviate by a predetermined measure from respective REQUIRED-commands of the control and monitoring unit.

* * * * *